(12) United States Patent
Hardy

(10) Patent No.: US 7,770,603 B2
(45) Date of Patent: Aug. 10, 2010

(54) FLEXIBLE TUBULAR PIPE WITH AN ANTI-WEAR SHEATH

(75) Inventor: Jean Hardy, Barentin (FR)

(73) Assignee: Technip France (FR)

( * ) Notice: Subject to any disclaimer, the term of this patent is extended or adjusted under 35 U.S.C. 154(b) by 224 days.

(21) Appl. No.: 11/913,605

(22) PCT Filed: May 3, 2006

(86) PCT No.: PCT/FR2006/000992

§ 371 (c)(1), (2), (4) Date: Nov. 29, 2007

(87) PCT Pub. No.: WO2006/120320

PCT Pub. Date: Nov. 16, 2006

(65) Prior Publication Data

US 2008/0190507 A1    Aug. 14, 2008

(30) Foreign Application Priority Data

May 11, 2005    (FR)    ................................ 05 04739

(51) Int. Cl.
*F16L 11/00*    (2006.01)
(52) U.S. Cl. ........................................ 138/134; 138/135
(58) Field of Classification Search ................. 138/134, 138/135
See application file for complete search history.

(56) References Cited

U.S. PATENT DOCUMENTS

| | | | | |
|---|---|---|---|---|
| 5,281,664 A * | 1/1994 | Golovoy et al. | ................ | 525/64 |
| 5,730,188 A * | 3/1998 | Kalman et al. | ................ | 138/135 |
| 5,750,620 A * | 5/1998 | Davies et al. | ................ | 525/67 |
| 5,934,335 A * | 8/1999 | Hardy | ................ | 138/131 |
| 2001/0003992 A1 | 6/2001 | Espinasse | ................ | 138/135 |
| 2005/0173012 A1* | 8/2005 | McKeen | ................ | 138/146 |
| 2005/0229992 A1* | 10/2005 | McKeen et al. | ................ | 138/141 |

FOREIGN PATENT DOCUMENTS

| | | |
|---|---|---|
| FR | 2 229 913 | 12/1974 |
| FR | 2 794 516 | 12/2000 |
| FR | 2 861 158 | 4/2005 |
| WO | WO 2004/023026 | 3/2004 |

OTHER PUBLICATIONS

PCT International Search Report dated Sep. 6, 2006 issued in corresponding PCT International Appln. No. PCT/FR2006/000992.

* cited by examiner

*Primary Examiner*—Patrick F Brinson
(74) *Attorney, Agent, or Firm*—Ostrolenk Faber LLP

(57) ABSTRACT

A flexible tubular conduit for transporting hydrocarbons comprising at least two metal sheathing covers which are separated by a plastic anti-wear layer. Each cover is produced by helically winding a metal longitudinal element. The anti-wear layer is produced by helically winding a plastic material strip. The plastic material comprises an amorphous polymer with a glass transition temperature ranging from 175 to 255° C.

16 Claims, 1 Drawing Sheet

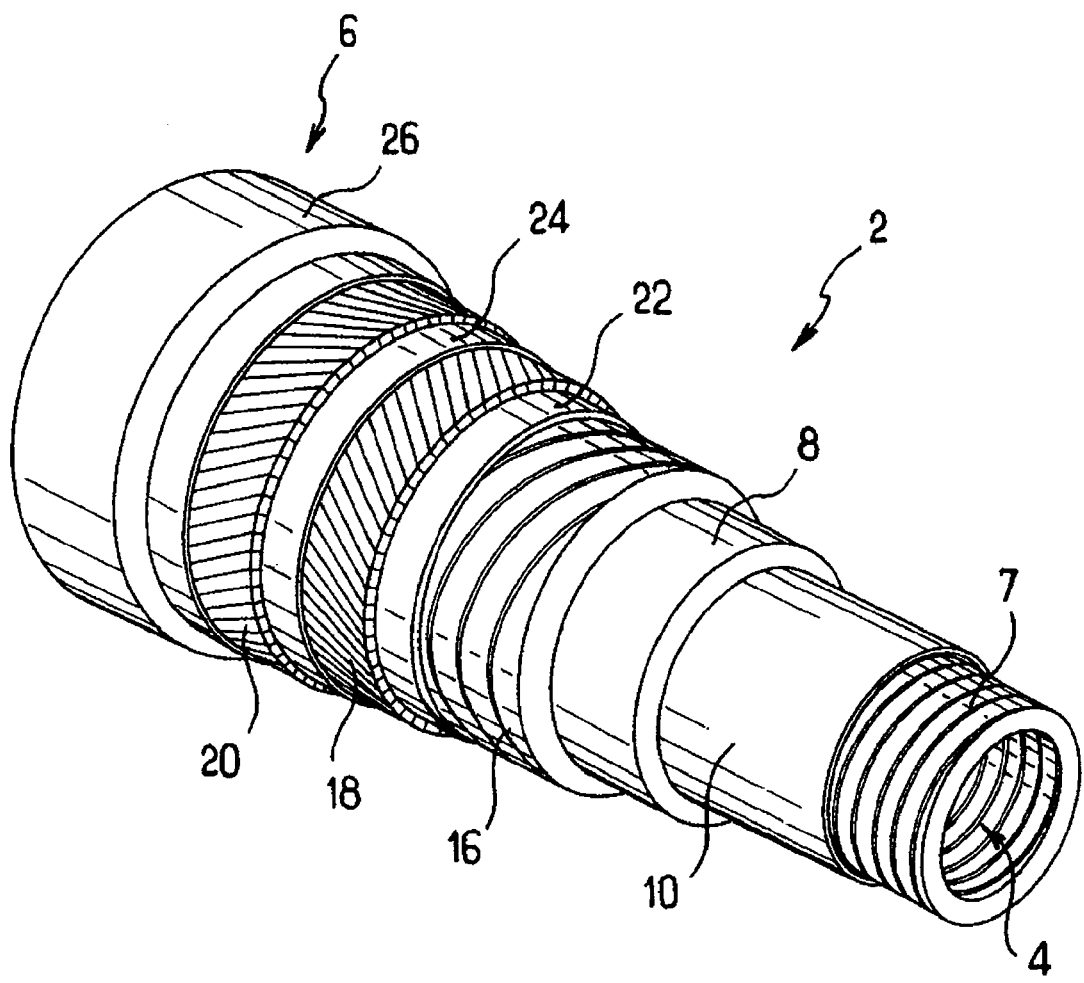

FLEXIBLE TUBULAR PIPE WITH AN ANTI-WEAR SHEATH

CROSS REFERENCE TO RELATED APPLICATION

The present application is a 35 U.S.C. §§371 national phase conversion of PCT/FR2006/000992, filed 3 May 2006, which claims priority of French Application No. 05/04739, filed 11 May 2005. The PCT International Application was published in the French language.

BACKGROUND OF THE INVENTION

The present invention relates to flexible tubular pipes for transporting hydrocarbons.

It relates more precisely to a pipe of the type described in the standardized documents published by the American Petroleum Institute (API) and especially documents API 17J and API RP 17B.

This type of pipe comprises successive layers that are independent of one another consisting, on the one hand, of helical windings, of tapes and/or of profiled wires and, on the other hand, of at least one sheath made of polymer material. Whereas the metal layers have the function of taking up the mechanical forces, both internal and external, the polymer sheaths have the function of providing internal or external sealing.

The various layers are to a certain extent movable one with respect to another so as to allow the pipe to bend. Various structures exist for such pipes, however they all generally have a multilayer assembly called a pressure vault, intended to take up the radial forces, and a multilayer assembly intended to take up the axial forces.

Usually, the pressure vault located on the inside of the pipe consists of a short-pitch helical winding of a profiled wire, and the layers intended to take up the axial forces, located on the outside of the pipe, generally consist of a pair of armor plies consisting of crossed wires wound helically with a long pitch.

SUMMARY OF THE INVENTION

Furthermore, to prevent at least two of these armor plies from being directly in contact with each other, something which would cause them to wear prematurely, a relatively thin intermediate layer of plastic is interposed.

The reader may in particular refer to document EP 0 929 767, which describes a pipe equipped with such an intermediate anti-wear layer.

It is known to produce such an anti-wear layer by helically winding an anti-wear tape obtained by extruding a polyamide-based or polyolefin-based plastic.

However, these intermediate layers rapidly deteriorate when the flexible pipes undergo large stresses, such as those encountered when operating certain offshore oilfields, lying at great depth, and where the hydrocarbon is at a high temperature of about 130° C. Under such conditions, these intermediate anti-wear layers may suffer temperatures close to 110° C. and contact pressures of around 300 to 400 bar.

Furthermore, one problem that arises, and it is this that the present invention therefore intends to solve, is how to provide a flexible tubular pipe whose intermediate plastic anti-wear layer is not only resistant to severe operating conditions but also able to be obtained for an advantageous cost.

For this purpose, and according to a first aspect, the invention provides a flexible tubular pipe for transporting hydrocarbons, said flexible tubular pipe comprising at least two metal armor plies separated by an anti-wear layer made of a plastic, each of said plies being produced by helically winding a longitudinal metal element and said anti-wear layer being produced by helically winding a tape of said plastic; according to the invention, said plastic comprises an amorphous polymer, the glass transition temperature of which is between 175 and 255° C.

Thus, one feature of the invention lies in the use of an amorphous polymer, by itself or as a blend, the glass transition temperature of which is between 175 and 255° C., in the plastic used to form an intermediate anti-wear layer. For example, the glass transition temperature of the amorphous polymer is between 210 and 240° C.

Although high-performance amorphous polymers are not recommended in applications in which tribological qualities are desired and especially wear resistance, it turns out that, very surprisingly, such materials retain their properties throughout the lifetime of the flexible tubular pipe. Other materials could advantageously be envisioned, from among high-performance semicrystalline materials, however, on the one hand, these are not easy to process by extrusion in the form of long tapes, something which is absolutely necessary in order to be able to tape the pipes, and, on the other hand, they are extremely expensive.

According to one particularly advantageous first embodiment of the invention, said amorphous polymer is a polymer containing a sulfonated group, or more precisely a sulfone group, that is to say a group comprising a sulfur atom and two oxygen atoms linked to the sulfur atom via two double bonds. Such polymers are normally used in the field of plastic injection molding, but in no way in the field of extrusion in which high-molecular-weight polymers have to be used.

Consequently, thanks to the use of relatively inexpensive polymers containing sulfonated groups, the glass transition temperature of such polymers being on average close to 220° Celsius, the intermediate anti-wear layer is relatively resistant and does not creep between the wound elements of each of the armor plies, the spacing of which may be up to a few millimeters. In particular, it does not creep when it is raised to a temperature of around 110° C. and is subjected to a pressure close to 400 bar. These conditions may be combined in the case of operating deep-sea oil wells. Furthermore, these polymers containing sulfonated groups give the plastic high hydrolysis resistance, thereby retarding their aging.

Preferably, said amorphous polymer is a polyphenyl-sulfone (PPSU), which has all the mechanical, thermal and aging characteristics required.

Moreover, said plastic comprises at least 60% by weight of said amorphous polymer, the balance, formed from various additives, especially fillers, consequently being less than 40%.

Advantageously, said plastic furthermore includes a filler intended to reduce the coefficient of friction of said plastic so that the armor plies can act relative to one another when the pipe bends, the intermediate plastic layer then permitting the armors to rub against it, despite the high pressures that are exerted. According to a preferred embodiment, said plastic has a proportion by weight of filler of less than 20%. This results in a good coefficient of friction of the intermediate layer against the armor plies, while still maintaining mechanical performance sufficient for the application.

For example, said filler is a synthetic material of the fluorinated or perfluorinated polymer type with a molecular weight suitable for the use, in oil, paste or powder form. The filler may also consist of molybdenum disulfide or compounds based on aliphatic fatty chains, whether halogenated or not.

Moreover, the plastic thus produced gives the anti-wear layers creep resistance in the flexible tubular pipes that the previously used plastics did not have. The creep of the anti-wear layers between the turns of the armor plies of a flexible structure is a complex phenomenon which is difficult to model and requires an enormous number of tests under the service conditions of the flexible pipes. Furthermore, the technical data on the commercially available polymers provide no information or properties allowing a reasoned choice of polymer for solving this technical problem of creep to be made.

According to another embodiment of the invention, said plastic furthermore includes a semicrystalline polymer, for example a polyetheretherketone (PEEK) blended with the amorphous polymer in a proportion by weight of less than 20%, for example between 5 and 15%, of polyether-etherketone so as to benefit from the properties both of the amorphous polymer and of the semicrystalline polymer, which in general exhibits good tribological properties.

Furthermore, said plastic advantageously has a tensile modulus of elasticity, or tensile modulus, measured according to the ASTM D 638 standard, at a temperature of 20° C., of between 1800 and 3200 MPa. This gives the tape of said plastic a flexural stiffness allowing it to be wound helically around the pipe without any difficulty. For example, this tensile modulus is between 2100 and 2700 MPa.

Preferably, said plastic of the intermediate layer has a tensile strength at yield, or yield strength, of greater than 40 MPa and advantageously 60 MPa, so as to be able to withstand being placed around an armor ply, during which operation a plastic tape may be subjected to stresses of the order of several tens of MPa.

Furthermore, and particularly advantageously, said plastic has a tensile elongation at yield, or yield elongation, of greater than 5% and preferably greater than 7%, so as to be sufficiently elastic to follow the movements of the flexible pipe in service.

Furthermore, and preferably, the plastic has an elongation at break of greater than 20% and preferably greater than 50%.

According to a second aspect, the invention provides a process for producing a flexible tubular pipe for transporting hydrocarbons, said process being of the type whereby at least two longitudinal metal elements are wound helically in sequence to form two armor plies, plastic tapes being wound helically between said armor plies to form an anti-wear layer; according to the invention, a plastic comprising an amorphous polymer, the glass transition temperature of which is between 175 and 255° C., is used to form said tapes. Furthermore, and particularly advantageously, said plastic is extruded, thereby simplifying the processing of the material, in particular so as to form thin sheets of great length.

Preferably, said sheets are slit in order to obtain said tapes so as to condition them for being installed on a pipe production device. Moreover, said tapes are advantageously butt-welded by ultrasonic welding.

BRIEF DESCRIPTION OF THE DRAWING

Other features and advantages of the invention will become apparent on reading the description given below of particular embodiments of the invention, given by way of indication but implying no limitation, and with reference to the appended drawings in which:

FIG. 1 is a partial schematic view in perspective of a flexible tubular pipe according to the invention.

The single FIGURE thus shows partially a portion of a flexible pipe 2 comprising, from the inside 4 to the outside 6: a flexible metal tube or carcass 7, produced by the short-pitch helical winding of metal strips or wires; an internal sealing sheath or pressure sheath 8 placed around the carcass 7; a covering layer 10 between the carcass 7 and the pressure sheath 8; a pressure vault 16 formed from a short-pitch winding around the pressure sheath 8, of an interlocked metal profiled wire, intended to take up the internal pressure forces; a first tensile armor ply 18 and a second tensile armor ply 20. These armor plies are formed from wires wound with a long pitch and intended to take up the longitudinal tensile forces to which the flexible pipe 2 may be subjected.

Furthermore, and in accordance with the invention, the pipe 2 has a first helical winding 22 of a tape of plastic in order to form a first anti-wear layer between the pressure vault 16 and the first armor ply 18, and a second helical winding 24 of a tape of the same plastic in order to form a second anti-wear layer between the two tensile armor plies 18, 20. Thanks to these two anti-wear layers, the armor plies 18, 20 and the pressure vault 16 are, respectively, not directly in contact with one another, so that, when the flexible pipe 2 bends, there is no wear due to the metal armor plies rubbing against one another.

These plastic tapes comprise an amorphous polymer, the glass transition temperature of which is between 175 and 255° C., and advantageously between 210 and 240° C., and are obtained by extrusion.

The plastic compositions that can be used, and more particularly the type of amorphous polymer that is suitable, will be explained in detail below.

Amorphous polymers, which are not renowned for their tribological performance, that is to say their resistance to frictional wear, have proved to be excellent materials in this armor ply anti-wear application.

The amorphous polymers that have proved to be good candidates in the aforementioned application are polysulfone (PSU), polyethersulfone (PES), polyphenyl-sulfone (PPSU) and polyetherimide (PEI), the glass transition temperatures of which are between 185 and 250° C. Among these polymers, those containing a sulfone group (PSU, PES and PPSU) appear to be the more resistant.

This is because they have a tensile modulus close to 2500 MPa and an elongation at break of greater than 60%. Furthermore, they have a yield elongation of greater than 5% and a yield strength of greater than 60 MPa.

Moreover, by blending it with fluorinated or perfluorinated compounds of the polytetrafluoroethylene (PTFE) or perfluoropolyether (PFPE) type or else with molybdenum disulfide it is possible not only to increase the ductility of the plastic but, in addition, to improve its coefficient of friction with the metal armors.

Furthermore, the hydrolysis resistance and the chemical resistance of the aforementioned amorphous materials is very considerably higher than that of polyamides for example, which hitherto have been used to produce anti-wear layers.

In addition, the amorphous materials adopted have a glass transition temperature well above the service temperature to which the plastic is exposed, at most 110° C., in such a way that the mechanical properties in service are barely affected.

Consequently, the materials, on the one hand, retain their anti-wear properties and, on the other hand, do not deteriorate over the course of time and under the movements of the flexible tubular pipe although the stresses, and in particular the compressive stresses, are extremely high, around 300 to 400 bar.

Other, semicrystalline, polymers could be suitable on account of their properties, and especially their tribological characteristics. These are in particular polyetheretherketone (PEEK), polyimide (PI), liquid crystal polymers (LCPs), polyphthalamide (PPA) and polyphenylene sulfide (PPS). However, these all have the drawback of being expensive and not easy to process, in particular for producing sheets by extrusion. Furthermore, reinforcing fillers, for example of the glass fiber or carbon fiber type, must be added to them in order to increase their deformation under load capability.

However, they may be blended with the aforementioned amorphous polymers with a limit of 20%, preferably between 5 and 15%, by weight so as to confer tribological properties intrinsic to the semicrystalline polymers on the aforementioned plastic.

The invention also relates to a process for producing flexible tubular pipes for transporting hydrocarbons. The proportion by weight of the amorphous polymer in the plastic is greater than 60% and advantageously greater than 80%. According to one particular embodiment of the invention, polyphenylsulfone (PPSU) is blended with 15% polytetrafluoroethylene (PTFE) and extruded through a very wide sheet die, for example 1.00 meter wide, so as to obtain a long sheet with a thickness of 1.5 mm and a width of approximately 1.00 meter.

According to another embodiment of the invention, the blend comprises 80% polyphenylsulfone (PPSU), 10% polyetheretherketone (PEEK) and 10% polytetrafluoroethylene (PTFE).

Simultaneously, after being cooled, the sheet is wound up to produce a mother reel a few hundred meters in length.

Next, the sheet is slit in order to obtain tapes 50 to 100 mm in width, which are rewound onto daughter reels, to be installed on a conventional tape winder mounted in line with a spiraller or armoring device for laying down the metal armor wires. Consequently, there is no need to modify or adapt said existing tape winder in order to install these plastic tapes thereon.

According to the process, a profiled wire is firstly wound helically, with a short pitch, to produce the pressure vault 16. Next, a plastic tape, of the afore-mentioned type containing an amorphous polymer, is wound helically to produce the first winding 22 on the pressure vault 16. This plastic tape is generally applied with a tension of around 100 to 150 daN, which imposes an average stress on the tape of around 10 to 20 MPa.

Furthermore, and according to one particularly advantageous feature of the invention, the plastic tapes are butt-welded, when this is necessary, by ultrasonic spot welding. To do this, the two ends of the tapes to be butt-welded are brought together, one above the other, and a suitable sonotrode is applied to the two ends.

Next, the first tensile armor ply 18 is formed on the first winding 22 and a plastic tape is again wound helically onto the tensile armor ply 18, to form the second winding 24.

Finally, the second tensile armor ply 20 is applied to the second winding 24 and then covered with a protective sheath 26.

However, other layers, whether made of plastic or metal, can be incorporated into the flexible pipe 2 upstream of the pressure vault 16 or downstream of the second tensile armor ply 20.

The invention claimed is:

1. A flexible tubular pipe for transporting hydrocarbons, said flexible tubular pipe comprising
   at least two metal armor plies and an anti-wear layer made of a plastic separating said plies, each of said plies comprises a helically wound longitudinal metal element and said anti-wear layer comprises a helically wound tape of said plastic, said plastic of said layer comprises an amorphous polymer having a glass transition temperature between 175 and 255° C.

2. The flexible tubular pipe as claimed in claim 1, wherein said amorphous polymer is a polymer containing a sulfonated group.

3. The flexible tubular pipe as claimed in claim 2, wherein said amorphous polymer is a polyphenylsulfone.

4. The flexible tubular pipe as claimed in claim 1, wherein said plastic comprises at least 60% by weight of said amorphous polymer.

5. The flexible tubular pipe as claimed in claim 1, wherein said plastic includes a filler operable to reduce the coefficient of friction of said plastic.

6. The flexible tubular pipe as claimed in claim 5, wherein said plastic has a proportion by weight of filler of less than 20%.

7. The flexible tubular pipe as claimed in claim 5, wherein said filler is a fluorinated or perfluorinated synthetic material.

8. The flexible tubular pipe as claimed in claim 1, wherein said plastic furthermore includes a semicrystalline polymer.

9. The flexible tubular pipe as claimed in claim 8, wherein said plastic has a proportion by weight of semicrystalline polymer of less than 20%.

10. The flexible tubular pipe as claimed in claim 1, wherein said plastic has a tensile elastic modulus of between 1800 and 3200 MPa.

11. The flexible tubular pipe as claimed in claim 1, wherein said plastic has a yield strength of greater than 40 MPa.

12. The flexible tubular pipe as claimed in claim 1, wherein said plastic has a yield elongation of greater than 5%.

13. A process for producing a flexible tubular pipe for transporting hydrocarbons, said process comprising winding at least two longitudinal metal elements helically in sequence to form two armor plies with one ply outside another ply, winding plastic tapes helically between said armor plies to form an anti-wear layer, wherein the tapes are of a plastic comprising an amorphous polymer having a glass transition temperature between 175 and 255° C.

14. The process as claimed in claim 13, further comprising extruding the plastic in the form of long sheets and forming the tapes therefrom.

15. The process as claimed in claim 14, further comprising slitting said sheets to form said tapes.

16. The process as claimed in claim 15, further comprising butt-welding said tapes by ultrasonic welding.

* * * * *